United States Patent [19]

Krueger et al.

[11] Patent Number: 4,864,484
[45] Date of Patent: Sep. 5, 1989

[54] HIGH-PASS ELEMENT OF A FILTER ASSEMBLY FOR A LINE CONNECTED WITH STATIC CONVERTERS

[75] Inventors: Kurt Krueger, Erlangen; Heino Schmitt, Buckenhof; Walter Schultz, Kleinsendelbach, all of Fed. Rep. of Germany

[73] Assignee: Siemens Aktiengesellschaft, Munich, Fed. Rep. of Germany

[21] Appl. No.: 280,017

[22] Filed: Dec. 5, 1988

[30] Foreign Application Priority Data

Dec. 4, 1987 [DE] Fed. Rep. of Germany ....... 3741197
Mar. 21, 1988 [DE] Fed. Rep. of Germany ....... 3809444

[51] Int. Cl.$^4$ .............................................. H02M 1/12
[52] U.S. Cl. ..................... 363/45; 307/105; 333/167
[58] Field of Search ............. 363/45, 46, 47; 307/105; 333/167, 172, 176

[56] References Cited

U.S. PATENT DOCUMENTS

| | | | |
|---|---|---|---|
| 3,038,134 | 6/1982 | Forssell | 333/181 |
| 3,535,542 | 10/1970 | Gilsig | 307/105 |
| 3,555,291 | 1/1971 | Dewey | 307/105 |
| 3,881,137 | 4/1975 | Thanawala | 307/105 |
| 4,209,757 | 6/1980 | Becker | 307/105 |
| 4,406,991 | 9/1983 | Strycula et al. | 333/167 X |
| 4,743,873 | 5/1988 | Schultz et al. | 333/167 X |

FOREIGN PATENT DOCUMENTS

| | | |
|---|---|---|
| 0222261 | 5/1987 | European Pat. Off. . |
| 3539950 | 5/1987 | Fed. Rep. of Germany . |
| 2008868 | 6/1979 | United Kingdom . |

*Primary Examiner*—Patrick R. Salce
*Assistant Examiner*—Emanuel Todd Voeltz
*Attorney, Agent, or Firm*—Herbert L. Lerner; Laurence A. Greenberg

[57] ABSTRACT

A high-pass element of a filter assembly for a line connected to static converters having a high voltage level for filtering harmonics and damping resonance sites includes a first series circuit including a first capacitor, a first choke coil, and a second choke coil. A resistor is connected in parallel with the choke coils. A second series circuit is connected directly in parallel with the second choke coil. The second series circuit includes a second capacitor and a damping resistor. On the other hand, the second capacitor and the damping resistor may be in parallel with the second choke coil and at least one other series circuit may be connected in parallel with the second choke coil. The at least one other series circuit includes a series capacitor and a series resistor.

6 Claims, 2 Drawing Sheets

HIGH-PASS ELEMENT OF A FILTER ASSEMBLY FOR A LINE CONNECTED WITH STATIC CONVERTERS

The invention relates to a high-pass element of a filter assembly for a line with a high voltage level connected with static converters, for filtering harmonic oscillations and damping resonance sites, including a series circuit of a first capacitor, a first choke coil, a second choke coil, a resistor connected in parallel with the two choke coils, a second capacitor in parallel with the second choke coil, and a damping resistor in parallel with the second choke coil.

A double high-pass element of the above-described type is known from German Published, Non-Prosecuted Application DE-OS No. 35 39 950. In that apparatus, the parallel capacitor and the parallel resistor are dimensioned for the same voltage or voltage level that is present at the parallel choke. The apparatus has corresponding incident losses and resultant structural sizes.

It is accordingly an object of the invention to provide a high-pass element of a filter assembly for a line connected with static converters, which overcomes the hereinaforementioned disadvantages of the heretofore-known devices of this general type and which furnishes a high-pass element of a filter assembly for damping at least two parallel resonances, which can be retrofitted into existing systems, with a further reduction in cost and in the space required.

With the foregoing and other objects in view there is provided, in accordance with the invention, a high-pass element of a filter assembly for a line connected to static converters having a high voltage level for filtering harmonics and damping resonance sites, comprising a first series circuit including a first capacitor, a first choke coil, and a second choke coil; a resistor connected in parallel with the choke coils; and a second series circuit connected directly in parallel with the second choke coil, the second series circuit including a second capacitor and a damping resistor.

This embodiment is distinguished by a simple structure, for which small, low-loss components can be used.

With the objects of the invention in view, there is also provided a high-pass element of a filter assembly for a line connected to static converters having a high voltage level for filtering harmonics and damping resonance sites, comprising a first series circuit including a first capacitor, a first choke coil, and a second choke coil; a resistor connected in parallel with the choke coils; a second capacitor in parallel with the second choke coil; and a damping resistor in parallel with the second choke coil; and at least one second series circuit connected in parallel with the second choke coil, the at least one second series circuit including a series capacitor and a series resistor.

This embodiment enables simple damping of further frequency ranges, with the same basic filter structure, so that additional filters constructed for a high voltage level can be dispensed with.

In accordance with another feature of the invention, there is provided at least one third series circuit connected in parallel with the second choke coil, the at least one third series circuit including a series capacitor and a series resistor.

In accordance with a further feature of the invention, the at least one second or third series circuit additionally includes a series choke coil.

In accordance with a concomitant feature of the invention, there is provided a further parallel oscillation circuit connected in series with the second choke coil, the further parallel oscillation circuit including a parallel capacitor, a parallel choke coil and a parallel resistor.

Other features which are considered as characteristic for the invention are set forth in the appended claims.

Although the invention is illustrated and described herein as embodied in a high-pass element of a filter assembly for a line connected with static converters, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
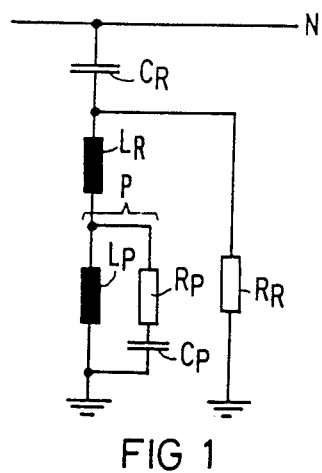
FIG. 1 is a schematic circuit diagram of a double high-pass element, in which a damping resistor is disposed in series with a second capacitor.

Referring now to the figures of the drawings in detail and first, particularly, to FIG. 1 thereof, there is seen a double high-pass element connected to a line N, between a line pole and ground. The double high-pass element is formed of a series circuit of a first capacitor $C_R$, a first choke coil $L_R$ and a second choke coil $L_P$, a resistor connected parallel to the two choke coils $L_R$ and $L_P$, and a series circuit which is connected parallel to the second choke coil $L_P$ and is formed of a damping resistor $R_P$ and a second capacitor $C_P$.

The first capacitor $C_R$ can be referred to as the power element of the apparatus. First, coupling with the high voltage and separation from the low voltage level are performed, and second, when the filter is used for idle power compensation, the desired capacitive idle power Q is furnished by the first capacitor $C_R$. This corresponds to $$Q \sim U^2 \cdot \omega \cdot C_R$$

where U is the power supply voltage and $\omega$ is the circuit frequency.

Due to the series circuit of the damping resistor $R_P$ and the second capacitor $C_P$, the two components each only need to be constructed for a particular partial voltage $U_{RP}$, $U_{CR}$, rather than for the voltage $U_{LP}$ present at the second choke coil $L_P$. This results in lower losses, a smaller structural size, and less expense while the function remains the same.

The effect of the damping of the lower-ordinal-number harmonics originating in the parallel oscillation circuit P is that at most, a slight increase in resonance occurs between the power supply N and the filter assembly.

Figure 2:
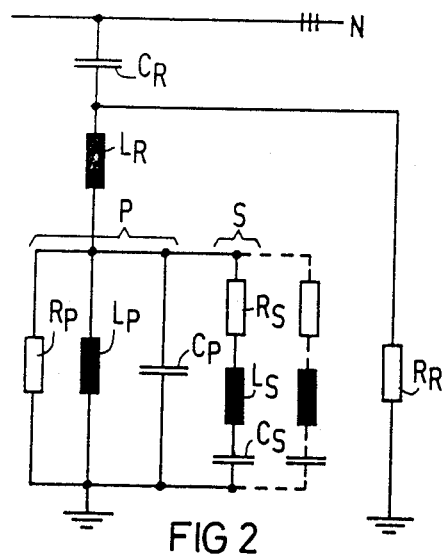
FIG. 2 is a circuit diagram of a high-pass element that contains a series circuit parallel to a parallel oscillation circuit thereof.

In FIG. 2, a double high-pass element which is known per se is expanded by a series circuit S disposed parallel to the second choke coil $L_P$ thereof. The line N is formed as a three-pole power supply system. One double high-pass element is connected to each of the three line poles.

The damping of the harmonics is attained with the parallel oscillation circuit P which is at a low voltage level. The expansion of the parallel oscillation circuit P by the series circuit S, provides a damping of further undesired harmonics, which was previously possible only by providing additional new and expensive filters. Since the series circuit S is disposed at a low voltage level, a substantially more favorable embodiment is the result. Due to the additional inclusion of further series circuits, still further harmonics can also be damped.

Figure 3:
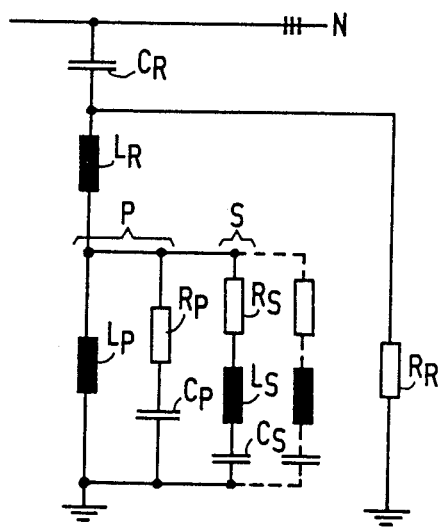
FIG. 3 is a circuit diagram of a high-pass element as in FIG. 1, having a series circuit parallel to a second choke coil thereof.

It is particularly favorable for at least one series circuit formed of a series capacitor and a series resistor of the second choke coil to be connected in parallel with the device shown in the first embodiment, as seen in FIG. 3. Through the use of this embodiment, the expense of constructing the filter assembly is particularly favorably reduced.

As shown in FIGS. 2 and 3, it is suitable if the series circuit S additionally has a series choke coil $L_S$. In this way, a simple damping of a frequency band is attained. The series circuit S then is equivalent to a high-value series oscillation circuit, the inherent circuit frequency $\omega$ of which results from $$\omega = \frac{1}{\sqrt{L_S \cdot C_S}}$$

Figure 4:
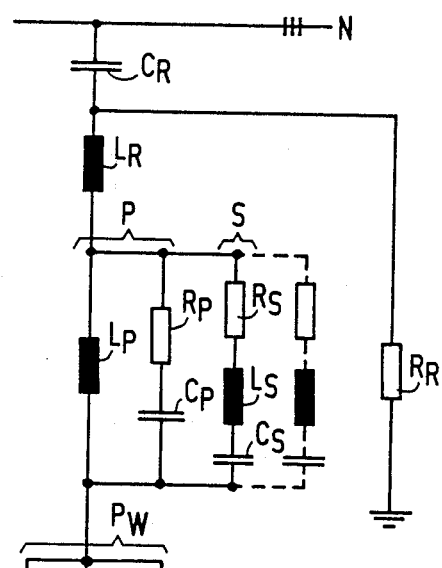
FIG. 4 is a circuit diagram of a high-pass element as in FIG. 3, having a parallel oscillation circuit in series with a second choke coil thereof.

FIG. 4 shows an expanded filter assembly. A particular advantage of this assembly is that a further parallel oscillation circuit $P_W$, which is formed of a parallel capacitor $C_W$, a parallel choke coil $L_W$ and a parallel resistor $R_W$, is connected in series with the second choke coil. This kind of embodiment permits optimized adaptation of the frequency response of the filter assembly to existing power supply and harmonic conditions. It is particularly well suited for a power supply that has a plurality of different harmonics.

Figure 5:
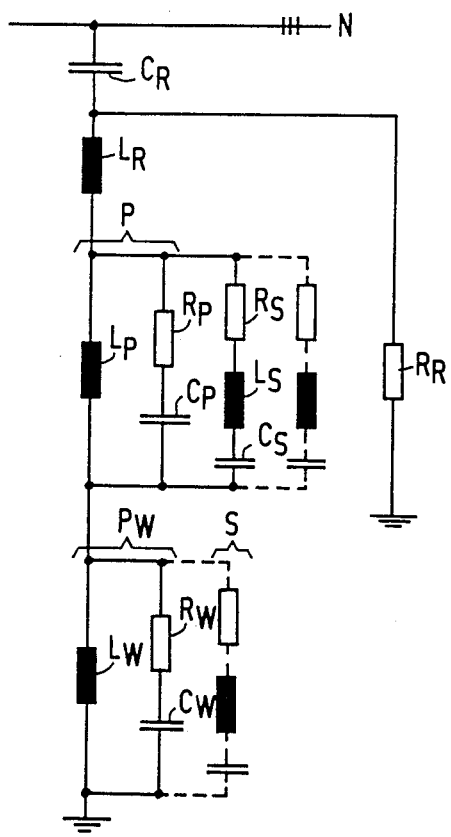
FIG. 5 is a circuit diagram of a high-pass element as in FIG. 4, in which a further parallel circuit has a parallel-connected series circuit.

FIG. 5 shows a further exemplary embodiment. In the further parallel oscillation circuit $P_W$ of this embodiment, the parallel resistor $R_W$ is connected in series with the parallel capacitor $C_W$.

One or more series circuits S can also be connected in parallel with the parallel circuit $P_W$. In this way, a damping of further harmonics is attained at a low voltage level.

Preferably, filter assemblies are used for the idle power compensation in stages in a power supply with a given switching order, and each filter assembly should be dimensioned in such a way that in the lower-ordinal-number harmonic range, only a slight increase in resonance takes place between the power supply and the particular filter assembly.

By connecting a filter assembly for idle power compensation to a line N of a power supply, a shift of the first parallel resonance site in the direction of lower ordinal numbers is brought about. By means of a suitable dimensioning of the parallel oscillation circuit in terms of this frequency, a damping of the first parallel resonance site is effected by the filter assembly itself. Since this furthermore takes place at the low voltage level of the filter assembly, no additional comprehensive filters that would have to be connected directly to the high voltage have to be provided.

The ordinal number $\nu$ of the harmonics is obtained approximately as $$\nu = \sqrt{\frac{S_K''}{Q_C}}$$

Here, $S_K''$ is the short-circuit power of the power supply, and $Q_C$ is the capacitive idle power furnished by the filter.

Idle power compensation can then be performed in stages as follows:

Three filters connectable to a line are for instance provided, each furnishing a proportion (which may be variable in size) of capacitive idle power. Their idle power proportion dictates an operating switching sequence. The frequency behavior of the individual filters is matched in such a way that the power supply status, optionally including a previously added filter, is taken into account. In this manner, only a slight excess increase in resonance can occur in the critical harmonic range.

The filter assembly can advantageously be calculated and constructed by means of a suitable digital program.

The exemplary embodiments described above are particularly suitable for expanding existing systems in which space limitations prohibit additional filters from being provided, and in which further space saving with existing filters might also be required.

The filter assemblies can advantageously be used with direct voltage and with alternating voltage, including polyphase voltage.

The foregoing is a description corresponding in substance to German Application No. P 38 09 444.4, dated Mar. 21, 1988, the International priority of that application and of German Application No. P 37 41 197.7, dated Dec. 4, 1987 being claimed for the instant application, and being hereby made part of this application. Any material discrepancies between the foregoing specification and the aforementioned corresponding German applications are to be resolved in favor of the latter.

We claim:

1. High-pass element of a filter assembly for a line connected to static converters having a high voltage level for filtering harmonics and damping resonance sites, comprising:
   (a) a first series circuit including:
      (a1) a first capacitor,
      (a2) a first choke coil, and
      (a3) a second choke coil;
   (b) a resistor connected in parallel with said choke coils; and
   (c) a second series circuit connected directly in parallel with said second choke coil, said second series circuit including:
      (c1) a second capacitor and
      (c2) a damping resistor.

2. High-pass element of a filter assembly for a line connected to static converters having a high voltage level for filtering harmonics and damping resonance sites, comprising:
   (a) a first series circuit including:

(a1) a first capacitor,
(a2) a first choke coil, and
(a3) a second choke coil:
(b) a resistor connected in parallel with said choke coils:
(c) a second capacitor in parallel with said second choke coil; and
(d) a damping resistor in parallel with said second choke coil; and
(e) at least one second series circuit connected in parallel with said second choke coil, said at least one second series circuit including:
  (e1) a series capacitor and
  (e2) a series resistor.

3. High-pass element of a filter assembly according to claim 1, including:

(d) at least one third series circuit connected in parallel with said second choke coil, said at least one third series circuit including:
  (d1) a series capacitor and
  (d2) a series resistor.

4. High-pass element of a filter assembly according to claim 2, wherein said at least one second series circuit additionally includes a series choke coil.

5. High-pass element of a filter assembly according to claim 3, wherein said at least one third series circuit additionally includes a series choke coil.

6. High-pass element of a filter assembly according to claim 3, including a further parallel oscillation circuit connected in series with said second choke coil, said further parallel oscillation circuit including:
  (e1) a parallel capacitor,
  (e2) a parallel choke coil and
  (g3) a parallel resistor.

* * * * *